Sept. 9, 1969     C. F. HUDDLE     3,465,764
DAMPING MEANS FOR PORTABLE STRUCTURE
Filed July 19, 1967
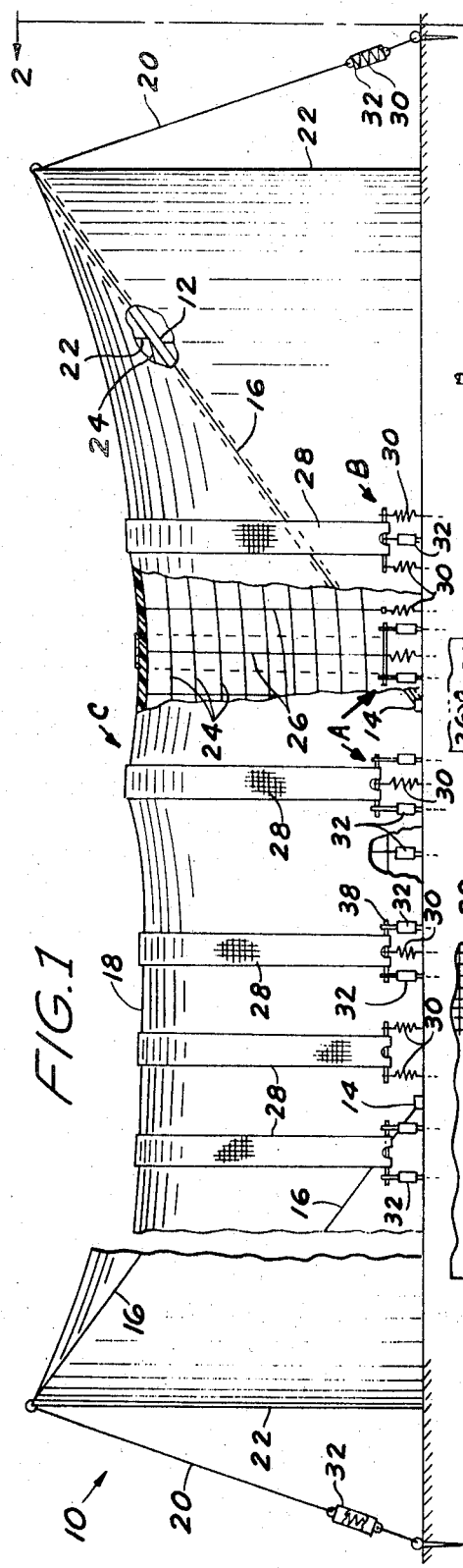
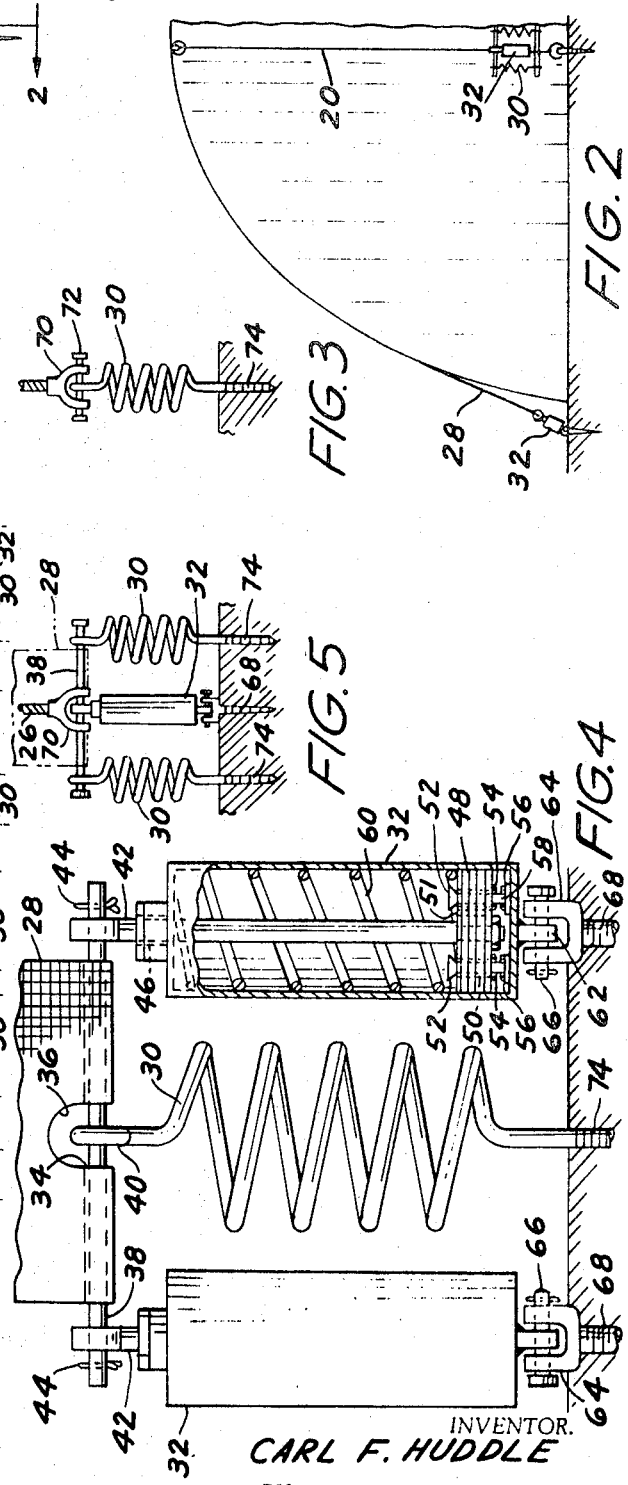
INVENTOR.
CARL F. HUDDLE
BY John P. Moran
ATTORNEY United States Patent Office 3,465,764
Patented Sept. 9, 1969

3,465,764
DAMPING MEANS FOR PORTABLE STRUCTURE
Carl F. Huddle, 3 Kenberton Drive,
Pleasant Ridge, Mich. 48069
Filed July 19, 1967, Ser. No. 654,425
Int. Cl. A45f 1/00; E04b 1/347
U.S. Cl. 135—1                                    5 Claims

ABSTRACT OF THE DISCLOSURE

A portable semi-rigid structure including a pair of arches inclined from a common base and pivotably tilted outward from each other, a flexible membrane attached to and stretched between the arches, longitudinal tension members secured to the arches to support the membrane, inverted tension members operatively connected to the longitudinal tension members and/or to the membrane to prevent ballooning thereof, and vibration damping means including at least one of the following: (A) spring-loaded dash-pots connected between the inverted tension members and the base; (B) springs connected between the inverted tension members and the base; (C) bands connected between the base and the membrane in series with spring-loaded dash-pots; and (D) bands connected between the base and the membrane in series with springs.

---

The present invention relates generally to improvements in novel architectural structures of the portable soft shell type illustrated and described in Patent No. 3,215,153, issued in the name of Carl F. Nuddle on Nov. 2, 1965. More particularly, the present invention relates to novel means for eliminating or diminishing vibrations and/or flutter in said structures.

Since these new soft shell structures can be of very lightweight construction, they are very susceptible to vibrations and flutter of the roof, end walls, and under certain conditions, vibration or shaking of the entire structure. The principal cause of such vibration is a pulsating wind force. Such flutter and vibration not only can cause damage to the structure and its contents, but could also cause the structure to fail structurally. Lightweight roofing materials such as membranes of plastic, fabric, treated paper and similar materials are especially vulnerable to damage by flapping, whipping, or fluttering when excited by such pulsating wind forces. These seemingly minor vibrations could constitute the beginning of a resonance of harmonic period of vibration that ultimately causes the roof system to "gallop" and/or the entire structure to shake or vibrate in increasing tempo until damage or failure occurs. While such a condition may prevail for some time before damage or failure, it certainly would not be regarded as a safe condition, especially if such a structure were occupied by a public gathering. Sudden wind squalls, thunderstorms or even normal windy conditions can start such a vibratory condition. Once the structure or part of it reaches its natural frequency or even a harmonic frequency, the small pulsating wind forces serve to reinforce the frequency forces, amplifying the vibratory movement and its associated forces to objectionable and/or destructive states.

One known method of eliminating or diminishing some vibrations is to add mass to the system or parts thereof, but this defeats the purpose of the low-cost, portable, semi-permanent and easily erected and disassembled structure described in the above-mentioned patent.

Accordingly, the principal object of this invention is to provide a system of damping that can be directly or indirectly applied to such lightweight membrane structures that will prevent destructive vibratory action therein and make them safe for public use as well as for the shelter of property.

Another object of this invention is to provide such a system which automatically compensates for changes in elongation of the structural members due to stress and/or temperature changes, the latter, of course, changing from night to day and from season to season.

A further object of this invention is to provide such a system which prevents "local" flutter or whipping of light membrane material.

A more specific object of this invention is to provide such a system which comprises spring loaded dash-pot means which may include a spring arrangement in parallel therewith.

Other objects and advantages of this invention will become apparent from the following detailed description taken in conjunction with the accompanying drawings, wherein:

FIGURE 1 is a side elevational view in partial cross-section illustrating a typical architectural structure embodying the invention;

FIGURE 2 is a fragmentary end view taken along the line 2—2 of FIGURE 1 and looking in the direction of the arrows;

FIGURE 3 is an enlarged fragmentary view of a portion of FIGURE 1;

FIGURES 4 and 5 illustrate optional embodiments of the invention incorporated in the FIGURE 1 structure.

Referring now to the drawings in greater detail, FIGURE 1 illustrates an architectural structure 10 in the erected or assembled condition and embodying the invention. As was indicated in Patent No. 3,215,153, the structure 10 may range from a relatively small shelter to a comparably large structure covering, for example, a stadium or an arena. The structure 10 comprises two or more arcuate arch members 12 pivotally connected at their lower ends to a support frame 14 in the manner described in the above-mentioned patent. The arch members 12 extend outwardly from the center of the structure 10 at a suitable angularly inclined position defining the terminal edges 16 of the structure 10.

The peripheral portions of the arch members 12 are connected to a suitable roofing material 18 which extends therebetween and is maintained under controlled tension defining the roof line of the structure. Further rigidity of the structure is achieved, if desired, by employing suitable anchoring means such as columns or cables 20 which are connected to the arch members 12 at one end thereof restraining further angular pivoting movement of the arch members and maintaining the roofing material 18 under the prescribed tension.

Where protection or covering in addition to the extended roofing material 18 is desired, end walls or curtains 22 may be employed, extending around all or a portion of the open ends of the structure 10 and suspending from the arch members 12. If desired, the end walls 22 may be of a structural material and anchored at the lower ends thereof so as to serve as restraining means in lieu of employing the columns or cables 20.

The combination of curved arches 12, membrane 18 and positioning or anchoring system 20 produce a warped surface in the membrane 18.

In some structures, particularly the larger ones, it is desirable to support the membrane 18 by longitudinal tension members 24 extending between the arches 12. The membrane 18 and the members 24 can be preloaded or shaped by the inverted tension members 26. Either or both the members 24 and 26 can be attached to the membrane 18 to help hold it in place. In other words, the members 26 may act just the opposite of the members 24, the latter providing support for the membrane 18 and the former holding the membrane 18 and/or the members 24 down, tending to prevent "ballooning."

In applications where the membrane 18 is used alone between the arches 12, or where it is unattached to the members 24 and/or 26, it may be desirable to use inverted hold down members, such as wide bands 28 positioned over the membrane 18 to prevent ballooning and to serve as part of a dampening system as will be described below.

Inasmuch as the structure 10 is interconnected by elastic components, it will vibrate in part or in total when it is disturbed from its equilibrium status, such as by a wind force. In lieu of the known method of adding mass to the structure 10 to eliminate or diminish vibrations, the members 24 and 26 may be pre-tensioned. However, both the main tension support members 24, as well as the inverted members 26, must be increased in size as the pre-tensioning forces are increased in value to support a given roof (or end wall) load.

Some improvement in the diminution of vibration periods may also be acomplished by uneven spacing and uneven tensioning of these resilient members. Nevertheless, the complete system, and parts thereof, still have a natural period of vibration with accompanying harmonic frequencies which may be objectionable. These frequencies still depend on the mass, the preloading, the geometric configuration, and the forces acting on structure 10.

In accordance with the invention, a simpler, more efficient and more economical means for eliminating or diminishing vibrations comprises spring mechanisms 30 of varying stiffness, serving to provide uneven tensioning to members 26 or 28. The mechanism 30 may operate alone (FIGURES 1 and 3), or in parallel (FIGURES 1, 2, 4 and 5), with a dash-pot mechanism 32, as an additive to any or all the members 20, 26 and 28. The dash-pot 32 and/or the spring mechanism 30 may be connected to the band 28 by any convenient means, such as that illustrated in FIGURE 4. As illustrated, the band 28 may include a lateral opening 34 formed through the end thereof. The band 28 may further include a centrally located semi-circular cut-out portion 36. A rod 38 may be mounted through the opening 34 such that a looped end 40 of the spring 30 is connected thereto in the cut-out portion 36, and shafts 42 extending from the upper ends of a pair of dash-pot mechanisms 32 are connected to the ends thereof.

The rod 38 may be retained in place by cotter pins 44 positioned through openings in the rod 38 exterior the shafts 42.

The shaft 42 is slidably mounted through an opening 46 formed through the upper end of the dash-pot mechanism 32. The lower end of the shaft 42 is fixedly connected to a piston 48 which is slidably mounted within the cylindrical dash-pot 32. A plurality of openings 50 and 51 are formed longitudinally through the piston 48.

Valves 52 are urged toward a closed position in the openings 50 by springs 54 mounted between the underside of the piston 48 and flanges 56 formed on stems 58 extending from the valves 52 through the openings 50.

A spring 60 is mounted around the shaft 42 within the dash-pot cylinder 32, urging the piston 48 toward a downward position. The cylinder 32 is filled with any suitable fluid, such as oil. The cylindrical housing 32 is anchored to the mounting surface by any suitable means, such as by a boss 62, a yoke 64 and a pin 66 mounted therethrough. The yoke 64 may have a stem 68 extending downwardly therefrom for insertion into the surface.

It should be noted that the band 28 may be either loosely fitted over the membrane 18 or attached thereto, or may consist of a short strap connected to each side of the membrane 18.

Preferred embodiments are illustrated in FIGURES 4 and 5 and at A and B, respectively, in FIGURE 1, wherein a single spring mechanism 30 may be mounted between two dash-pot mechanisms 32, or a single dash-pot mechanism 32 may be mounted between two spring mechanisms 30. Either the FIGURE 4 structure or the FIGURE 5 structure may be connected to a band 28 or an inverted tension member 26. As illustrated in FIGURE 5, the member 26 may be connected to the shaft 38 by means of a yoke 70. Such a yoke 70 would suffice for connection with the spring 30 of FIGURE 3 via a shorter pin 72. The spring 30 may be anchored by a stem 74.

Referring once again to FIGURE 4, it may be noted that when pull is exerted on the band 28, the rod 38 (see C, FIGURE 1), the shaft 42 and the piston 48 will be lifted compressing the spring 60 and causing the valves 52 to close, thereby forcing the fluid to move downwardly through the opening 51. Once the upward force on the band 28 subsides, the valves 52 will open under the downward force of the spring 60, allowing fluid to return therethrough, as well as through the opening 51, in the usual dash-pot damping manner, i.e., the force is directly proportional to velocity. In other words, the faster a force attempts to move the membrane 18 and band 28 in an upward direction, the more difficult it is to move it, by virtue of the A or B (FIGURE 1) assemblies.

In either of these combinations, the spring 30 may or may not be required. For larger structures 10, the spring 30 is essential, due to the greater forces and weights involved. In smaller structures, the spring 60 within the dash-pot assembly 32 will suffice. If desired, the spring 30 may be positioned around the dash-pot mechanism 32.

As indicated above, when the structure 10 is large enough to warrant the use of the inverted tension members 26, either the A or B dash-pot assembly may be used to provide the fluid or viscous-damping described above. In some instances, springs 30 (FIGURE 3) alone may sufficiently diminish vibrations, particularly when they are of different sizes to provide variable tensioning of the members 26.

To supplement the above embodiments, an asbestos flocking or foamed plastic spray 76, such as polyurethane foam, may be employed, as illustrated in FIGURE 1, to fuse the members 18, 24 and 26 together, particularly when the structure 10 is a semi-permanent type. Such a lining 76 also serves to prevent "local" flutter or whipping of the membrane 18 when the membrane is of a light material.

It should be apparent from the above description that the invention not only provides a novel means for eliminating objectionable and possibly destructive vibratory movements of large soft shell structures which are subjected to wind forces, but also an automatic means for compensating for changes in elongation of structural members due to stress or temperature changes.

It should be further apparent that the combined dash-pot and spring assembly, whether it be the A or B version, could be connected to only one end of an individual band, with the other end thereof connected directly to the base.

It should also be apparent that the invention provides additional means for eliminating even "local" flutter or whipping of the membrane.

While but two embodiments, along with possible supplemental features, of the invention have been shown and described for purposes of illustration, it is apparent that other modifications of the invention may be possible within the scope of the appended claims.

I claim:

1. A portable structure comprising a plurality of arch members each terminating in end portions for pivotal engagement with the base on which the structure is to be mounted; a substantially inextensible roofing system extending between and connected to said arch members, said roofing system including roof support tension members connected between said arch members inverted tension members operatively connected to said support tension members, and a membrane supported thereby; a plurality of anchors attached respectively to said arch members and adapted to be disposed in tension and to be connected to said base, the arrangement being such that when said roofing system is tensioned said arch members are inclined outwardly and that each of said arch members can be pulled downwardly by the anchors in opposition to tension in said roofing system when the structure is erected; and means operatively connected between said roofing system and said base for diminishing vibrations in said roofing system resulting from wind forces, said vibration diminishing means including dash-pot means and connector means for operatvely connecting said dash-pot means to said roofing system, and spring means mounted in parallel with said dash-pot means.

2. A portable structure comprising a plurality of arch members each terminating in end portions for pivotal engagement with the base on which the structure is to be mounted, a substantially inextensible and continuous roofing fabric extending between and connected to said arch members, a plurality of anchors attached respectively to said arch members and adapted to be disposed in tension and to be connected to said base, the arrangement being such that when the roofing fabric is tensioned the arch members are inclined outwardly and that each of said arch members can be pulled downwardly by the anchors in opposition to tension in said roofing fabric when the structure is erected and spring-loaded dash-pots operatively connected between said roofing fabric and said base for tensioning said roofing fabric transversely of the longitudinal extent thereof.

3. The structure described in claim 2, including, additionally, a supporting tension system and an inverted tension system, operatively connected to each other and to said arches to support said roofing fabric.

4. A portable structure comprising a plurality of arch members each terminating in end portions for pivotal engagement with the base on which the structure is to be mounted, a substantially inextensible roofing material extending between and connected to said arch members, a plurality of anchors attached respectively to said arch members and adapted to be disposed in tension and to be connected to said base, the arrangement being such that when the roofing material is tensioned the arch members are inclined outwardly and that each of said arch members can be pulled downwardly by the anchors in opposition to tension in said roofing material when the structure is erected, and means operatively connected between said roofing material and said base for diminishing vibrations in said roofining material resulting from wind forces, said means including a plurality of bands positioned on said roofing material and acting transversely to the longitudinal extent thereof, and spring-loaded dash-pot means connected between said base and at least one end of said bands.

5. A portable structure comprising a plurality of arch members each terminating in end portions for pivotal engagement with the base on which the structure is to be mounted, a substantially inextensible roofing material extending between and connected to said arch members, a plurality of anchors attached respectively to said arch members and adapted to be disposed in tension and to be connected to said base, the arrangement being such that when the roofing material is tensioned the arch members are inclined outwardly and that each of said arch members can be pulled downwardly by the anchors in opposition to tension in said roofing material when the structure is erected, and means operatively connected between said roofing material and said base for diminishing vibratons in said roofing material resulting from wind forces, said means including at least one band positioned on said roofing material and acting transversely to the longitudinal extent thereof and spring-loaded dashpot means connected between said base and at least one end of said band.

References Cited

UNITED STATES PATENTS

| | | | |
|---|---|---|---|
| 2,827,138 | 3/1958 | Roy | 135—1 XR |
| 3,034,606 | 5/1962 | Wiegand | 52—146 XR |
| 3,215,153 | 11/1965 | Huddle | 135—4 |

KENNETH DOWNEY, Primary Examiner

U.S. Cl. X.R.

135—3